3,035,039
Patented May 15, 1962

3,035,039
POLYETHYLENE PROCESS AND CATALYST
Elmer J. Bradbury, Worthington, Ohio, assignor, by mesne assignments, to W. R. Grace & Co., New York, N.Y., a corporation of Connecticut
No Drawing. Filed Dec. 12, 1958, Ser. No. 779,844
12 Claims. (Cl. 260—94.9)

This invention is for improvements in or relating to the polymerization of ethylene. More specifically it pertains to a novel polymerization catalyst comprising essentially pretreated titanium hydride-aluminum in combination with an aluminum trialkyl.

The use of aluminum trialkyls per se as catalysts in ethylene polymerization reactions is old in the art; see U.S. 2,699,457 issued to K. Ziegler et al. The polymer product obtained therein ranges from butylene to wax range polymers.

I have found that the use of a catalyst comprising a mixture of titanium hydride and aluminum in combination with an aluminum alkyl e.g., triethyl aluminum, results in forming ethylene polymers having a melting point above 130° C., a density in the range of about 0.95–0.96 and a molecular weight of at least 20,000.

Summarily the invention is directed to a novel method of synthesizing ethylene polymers by subjecting ethylene in an inert solvent under superatmospheric pressure to the action of a catalyst prepared by intimately mixing particles of titanium hydride-aluminum with an aluminum trialkyl.

By "titanium hydride-aluminum" as the term is used herein, is meant discrete particles consisting essentially of titanium hydride in an intimate combination with aluminum. As used herein, the term "titanium hydride" means a composition of the formula $TiH_x$, wherein $x$ is greater than zero but not greater than about 2.0. $TiH_x$ in which $x$ is about 1.75 is available commercially by reduction of $TiO_2$ with $CaH_2$, and is suitable for use herein. There are small amounts of impurities in this commercial material (e.g., nitrogen, calcium, magnesium, silicon, aluminum, zirconium, etc.), but these have no material effect. The titanium hydrides do not necessarily have all of the hydrogen combined chemically with the titanium. When the amount of hydrogen is small, it is believed to produce a simple expansion in the normal Ti lattice, with little or no chemical combination. As the value of $x$ increases, the amount of chemical binding between hydrogen and titanium is believed to increase. Although $TiH_x$ in which $x=1.75$ is preferred (because cheaper, being available commercially), actually any titanium hydride is operable for use in this invention.

The catalyst used in this invention is suitably prepared by extruding into rods, under heat and pressure, a mixture of powdered aluminum and powdered titanium hydride, followed by grinding or otherwise comminuting the thus-extruded rods to particle form in an inert atmosphere, e.g., argon, and thereafter charging the powder to the polymerization reactor along with an aluminum trialkyl. The extrusion can be carried out in air, but since the rod surface is readily oxidized, this step is preferably done under nitrogen, argon, or other inert atmosphere.

The following examples will aid in understanding the invention but will in no way limit its scope.

*Example 1*
PREPARATION OF CATALYST

Catalyst components in the ratio of 7 grams of Al (minus 150 mesh) and 3 grams of titanium hydride (minus 200 mesh) were admixed and cold compacted at 5 tons per square inch with a reduction ratio of 8:1 at approximately 10 inches per minute. The admixed mass was heated to 450° C. and extruded in the shape of a ⅜" diameter rod under about 35,000 p.s.i. Extrusion pressures can be varied over a substantial range and still be operable. Extrusion pressures up to 100,000 p.s.i. or more may be employed; however, a preferred extrusion pressure range is 20,000–60,000 p.s.i. in this range an extrusion temperature of 400–600° C. is preferred. The extrusion was carried out in a metal tube under a slight pressure of argon, and the extruded rod was reduced to a finely divided state by grinding under an inert atmosphere (argon), and the resulting powder was stored in a vial under argon.

Upon admixing the thus-formed powder with an aluminum trialkyl a catalyst capable of polymerizing ethylene is produced.

*Example 2*

2 g. of the titanium hydride-aluminum powder as prepared in Example 1 in combination with 0.01 mole of aluminum triethyl (as a 25% solution in n-heptane) were charged under nitrogen to a 300 ml. stainless steel rocking bomb containing 50 ml. hexane as an inert solvent. The bomb was equipped with a gas inlet and outlet. The bomb was sealed, heat was applied to obtain and maintain a temperature of about 75° C., and ethylene was introduced until the ethylene partial pressure was about 500 p.s.i. therein. During the reaction frequent repressurizing with ethylene was necessary to maintain approximately 500 p.s.i. ethylene partial pressure. After 7 hours the bomb was cooled, depressurized, and opened. The contents were transferred to a beaker containing methanol-hydrochloric acid solution where it was boiled to dissolve impurities. The mixture was cooled and the resultant purified polyethylene was filtered and dried. The dried polyethylene weighed 16 g. and on characterization had a melting point in the range 131–132° C. and a density of 0.958.

*Example 3*

The procedure of Example 2 was followed except that the ethylene partial pressure maintained throughout the 7 hour run was about 1000 p.s.i. and the temperature of the bomb was 100° C. The purified dry polyethylene product weighed 13 g. with a melting point in the range 131–132° C. and a density of 0.956.

*Example 4*

The procedure of Example 1 was duplicated except that the catalyst components were admixed using the ratio of 6.6 g. of Al to 3.4 g. of titanium hydride and the extrusion pressure was about 56,000 p.s.i. The extruded product was ground under argon, and the thus-formed titanium hydride-aluminum powder was used in the following examples.

*Example 5*

Ethylene was compressed into a 300 ml. stainless steel rocking bomb containing 50 ml. of hexane solvent, 0.01 mole of aluminum triethyl and 2 g. of finely divided titanium hydride-aluminum as prepared in Example 4. The bomb was heated at 100° C. for 7 hours. During the reaction, the ethylene line was left connected to the bomb inlet and the ethylene partial pressure was maintained at 800 p.s.i. The total pressure was about 825 p.s.i.g. At the end of the 7 hour period, the bomb was cooled, depressurized, and opened. The contents therein were transferred to a beaker containing methanol-hydrochloric acid solution, where it was boiled to dissolve impurities. The mixture was cooled and the resultant purified polyethylene was filtered and dried. The dried ethylene polymer weighed 5 g., melted at 131–132° C., and had a density of 0.961.

Example 6

The procedure was the same as in Example 5 except that the polymerization reaction temperature was 50° C. and the ethylene partial pressure was maintained at 750 p.s.i. After a 7 hour reaction period and subsequent purification, 8 g. of high density polyethylene were isolated.

Although the aluminum trialkyl used in all the examples was aluminum triethyl the aluminum tri(lower) alkyls in general are operative with titanium hydride-aluminum to catalyze the polymerization of ethylene by the process of this invention. Such other aluminum trialkyls include trimethyl, tripropyl, triisopropyl, tributyl, triisobutyl, triamyl, triisoamyl, trihexyl, triisohexyl, triheptyl, and trioctyl aluminum.

In practicing this invention it has been found that ethylene partial pressures of at least about 100 p.s.i. are desirable to cause the polymerization reaction to proceed. Preferably, however, the ethylene partial pressure is at least 350 p.s.i. At higher temperatures, e.g., 150–250° C. it is possible to initiate polymerization at somewhat lower ethylene pressures; e.g., at 225° C. the partial pressure of ethylene can be as low as about 50 p.s.i. Even though there is a minimum combination of temperature and pressure necessary to start polymerization (i.e., the lowest pressure at which polymerization can be initiated at a given temperature, or vice versa), it has been found as a general rule that, once started, polymerization can be continued at lower temperatures and/or ethylene pressures.

Although the reaction can be carried out at relatively high pressures, e.g., 5,000–10,000 p.s.i., and higher, the additional expense of equipment required to withstand such pressures in general outweighs the increased yields and/or shorter reaction times.

For practical purposes, a reaction temperature in the range of 25–250° C. and ethylene partial pressures in the range of 150–1500 p.s.i. are preferred. For example, a temperature range of 50–100° C. using ethylene partial pressures of 500–1000 p.s.i. will give good results. Under these conditions, polyethylene having a melting point of 130–133° C. and a very low melt index is produced. At higher temperatures, the melting point of the polyethylene formed is slightly decreased and the melt index increased. Thus, it may be seen that variation in reaction temperature is a means of preparing a series of polyethylenes having different physical properties. Other means of varying the polymer molecular weight and crystallinity will be obvious to those skilled in the art.

As a reaction medium, substantially any inert material can be used which is liquid under the conditions of temperature and pressure employed and which has a solvent action on ethylene. These solvents are well-known to those skilled in the polyethylene art. The liquid hydrocarbons are preferred as reaction media, and should be free of materials that react with the catalyst, e.g., water, $CO_2$, $O_2$, acetylene, $NH_3$, and ethers, ketones and similarly reactive compounds. Suitable solvents include pentane, hexane, heptane, cyclohexane, octane, benzene, xylene, toluene, and the like.

The amount of catalyst is not critical. Relatively small amounts are operable to form relatively large amounts of polyethylene. In general, a practical range is 0.001–1.0 g. catalyst per mole of ethylene polymerized. Even large amounts of catalyst are operable, but present a purification problem.

The ratio of titanium hydride to aluminum is not critical, nor is the ratio of aluminum trialkyl to either the titanium hydride or to the aluminum critical. Weight ratios of titanium hydride:aluminum:aluminum trialkyl of 1–10:1–10:1–5 are operative; a preferred range is respectively 1–2:2–4:1–2.

For best results the titanium hydride-aluminum catalyst component should be prepared, stored, and transferred to the polyethylene synthesis vessel under an inert atmosphere, e.g., argon, lamp-grade nitrogen, and the like.

I claim:

1. The process of polymerizing ethylene that comprises subjecting ethylene in a liquid hydrocarbon reaction medium under superatmospheric pressure to the action of a catalyst formed by extruding a mixture of titanium hydride and aluminum at superatmospheric pressure, comminuting the thus-extruded mixture, and admixing an aluminum trialkyl with the thus-comminuted particles, the titanium hydride:aluminum:aluminum tri (lower) alkyl weight ratio being 1–10:1–10:1–5.

2. The process according to claim 1 wherein the aluminum trialkyl is aluminum triethyl.

3. The process according to claim 1 wherein the polymerization is performed within the temperature range of 25°–250° C. and under an ethylene partial pressure in the range of 50–5000 p.s.i.

4. The process according to claim 1 wherein the ethylene partial pressure is 500–1000 p.s.i. and the temperature is 50–100° C.

5. The process according to claim 1 wherein the medium is hexane.

6. The process of forming solid polyethylene in accordance with claim 1 that comprises subjecting ethylene under a partial pressure in the range of 500–1000 p.s.i. and a temperature range of 50°–100° C. in hexane to the action of a catalyst comprising titanium hydride-aluminum and aluminum triethyl.

7. The process according to claim 6 wherein the ethylene partial pressure is 500 p.s.i. and the temperature is 75° C.

8. The process according to claim 6 wherein the ethylene partial pressure is 1000 p.s.i. and the temperature is 100° C.

9. The process according to claim 8 wherein the weight ratio of titanium hydride:aluminum is about 1:2.

10. The method of forming a catalyst that includes the steps of extruding a mixture of titanium hydride and aluminum at superatmospheric pressure, comminuting the thus-extruded mixture, and admixing an aluminum trialkyl with the thus-comminuted particles, the titanium hydride:aluminum:aluminum tri (lower) alkyl weight ratio being 1–10:1–10:1–5.

11. The method according to claim 10 wherein the extrusion pressure is in the range of 20,000 to 60,000 p.s.i. and the extrusion temperature is 400–600° C.

12. The method according to claim 10 wherein the aluminum trialkyl is aluminum triethyl.

References Cited in the file of this patent

UNITED STATES PATENTS

| | | |
|---|---|---|
| 2,846,427 | Findlay | Aug. 5, 1958 |
| 2,891,044 | Matlack | June 16, 1959 |
| 2,920,066 | Nowlin et al. | Jan. 5, 1960 |

FOREIGN PATENTS

| | | |
|---|---|---|
| 1,147,868 | France | June 11, 1957 |
| 1,154,646 | France | Nov. 4, 1957 |